United States Patent
Lehr et al.

(10) Patent No.: US 9,225,392 B2
(45) Date of Patent: Dec. 29, 2015

(54) FLAT POWER COIL FOR WIRELESS CHARGING APPLICATIONS

(75) Inventors: Michael Lehr, Sunnyvale, CA (US); Manjirnath Chatterjee, San Francisco, CA (US); Dyke Shaffer, Santa Rosa, CA (US); Eric Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/982,485

(22) PCT Filed: Mar. 9, 2011

(86) PCT No.: PCT/US2011/027764
§ 371 (c)(1),
(2), (4) Date: Jul. 29, 2013

(87) PCT Pub. No.: WO2012/121724
PCT Pub. Date: Sep. 13, 2012

(65) Prior Publication Data
US 2013/0308256 A1    Nov. 21, 2013

(51) Int. Cl.
*H02J 7/02* (2006.01)
*H04B 5/00* (2006.01)
*G06F 1/26* (2006.01)

(52) U.S. Cl.
CPC ............... *H04B 5/0037* (2013.01); *G06F 1/26* (2013.01); *G06F 1/266* (2013.01); *H02J 7/025* (2013.01)

(58) Field of Classification Search
CPC ..... H02J 7/025; H04B 5/0031; H04B 5/0037; H04B 5/0075; H04B 5/0081
See application file for complete search history.

(56) References Cited

U.S. PATENT DOCUMENTS

| | | | | |
|---|---|---|---|---|
| 5,559,360 | A * | 9/1996 | Chiu et al. | 257/531 |
| 5,966,063 | A * | 10/1999 | Sato et al. | 336/200 |
| 6,225,677 | B1 * | 5/2001 | Kobayashi | 257/531 |
| 6,967,555 | B2 * | 11/2005 | Yu | H01F 5/003 |
| | | | | 257/E21.022 |
| 7,078,998 | B2 * | 7/2006 | Zhang et al. | 336/200 |
| 7,250,826 | B2 * | 7/2007 | Gabara | H03B 5/1841 |
| | | | | 331/117 FE |
| 7,317,354 | B2 * | 1/2008 | Lee | 330/200 |
| 7,429,899 | B2 * | 9/2008 | Gabara | 331/117 R |
| 7,576,514 | B2 | 8/2009 | Hui | |
| 7,786,836 | B2 * | 8/2010 | Gabara | 336/200 |
| 7,791,165 | B2 * | 9/2010 | Tanaka | 257/531 |

(Continued)

FOREIGN PATENT DOCUMENTS

| | | |
|---|---|---|
| CN | 1988069 | 6/2007 |
| KR | 20070068827 | 7/2007 |
| WO | WO-2010129369 | 11/2010 |

OTHER PUBLICATIONS

"Flex Circuits Design Guide", 2007, http://www.minco.com/uploadedFiles/Products/Flex_Circuits/Technical_Specifications/FC302.pdf.

(Continued)

*Primary Examiner* — Jeremy C Norris
*Assistant Examiner* — Nathan Milakovich
(74) *Attorney, Agent, or Firm* — Mahamedi Paradice LLP (57) ABSTRACT

A coil assembly is disclosed. The coil assembly includes a coil that is provided on a substrate. The coil includes a trace element that is wound on the substrate. The trace element includes an interior gap that extends or is present along at least a portion of the trace element. The interior gap is dimensioned to reduce a presence of eddy currents that would otherwise be generated when the coil is active to inductively transmit or receive signals.

24 Claims, 10 Drawing Sheets (56) References Cited

U.S. PATENT DOCUMENTS

| | | | |
|---|---|---|---|
| 8,385,822 B2 | 2/2013 | Chatterjee | |
| 8,401,469 B2 | 3/2013 | Chatterjee et al. | |
| 8,437,695 B2 * | 5/2013 | Chatterjee | H02J 17/00 307/104 |
| 8,666,459 B2 * | 3/2014 | Matsui | H01Q 1/243 320/108 |
| 8,712,324 B2 | 4/2014 | Corbridge et al. | |
| 8,866,259 B2 * | 10/2014 | Cheng et al. | 257/531 |
| 8,884,399 B2 * | 11/2014 | Cheng et al. | 257/531 |
| 8,890,470 B2 * | 11/2014 | Partovi | 320/108 |
| 8,954,001 B2 * | 2/2015 | Chatterjee | H02J 5/005 307/104 |
| 2007/0176704 A1 | 8/2007 | Gabara | |
| 2008/0067874 A1 | 3/2008 | Tseng | |
| 2009/0085706 A1 | 4/2009 | Baarman et al. | |
| 2009/0096413 A1 | 4/2009 | Partovi et al. | |
| 2010/0045114 A1 | 2/2010 | Sample et al. | |
| 2011/0050164 A1 * | 3/2011 | Partovi et al. | 320/108 |
| 2012/0274148 A1 * | 11/2012 | Sung et al. | 307/104 |
| 2012/0276854 A1 * | 11/2012 | Joshi | A61N 1/37229 455/73 |

OTHER PUBLICATIONS

ISA/US; International Search Report, mailed May 5, 2011, PCT/US11/27764.

* cited by examiner

FLAT POWER COIL FOR WIRELESS CHARGING APPLICATIONS

RELATED APPLICATIONS

This application relates to U.S. patent application Ser. No. 12/455,802, filed Jun. 4, 2009, entitled SHIELD FOR USE WITH A COMPUTING DEVICE THAT RECEIVES AN INDUCTIVE SIGNAL TRANSMISSION, which is a continuation-in-part of U.S. application Ser. No. 12/239,656, filed Sep. 26, 2008, entitled ORIENTATION AND PRESENCE DETECTION FOR USE IN CONFIGURING OPERATIONS OF COMPUTING DEVICES IN DOCKED ENVIRONMENTS, which claims the benefit of U.S. Provisional Application No. 61/142,195, filed Jan. 1, 2009, entitled TECHNIQUES FOR MAGNETICALLY COUPLING CHARGING CIRCUITS AND DEVICES; all of the aforementioned Patent Applications are hereby incorporated by reference.

This application also relates to U.S. patent application Ser. No. 12/478,766, filed Jun. 4, 2009, entitled INDUCTIVE SIGNAL TRANSFER SYSTEM FOR COMPUTING DEVICES; which is a continuation-in-part of U.S. patent application Ser. No. 12/239,656, filed Sep. 26, 2008, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2008, entitled PROTOCOL FOR REAL TIME POWER AND ACCESSORY DATA CONNECTION; Provisional U.S. patent application Ser. No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; all of the aforementioned Patent Applications are hereby incorporated by reference.

BACKGROUND OF THE INVENTION

Inductive charging enables a device to receive power without using conductive electrical contacts, such as those found in a plug. Inductive charging uses an electromagnetic field to transfer energy between two devices. Typically, a primary induction coil is used to create an electromagnetic field from within a charging device, and the electromagnetic field induces a secondary induction coil within a receiving device to generate a current.

The use of inductive coils for charging devices presents certain advantages, such as the convenience of charging without having to connect male or female connectors. In some situations, it may be beneficial to use inductive coils to charge a device instead of having exposed electrical contacts. However, due to the characteristics of the inductive coils, certain disadvantages exist. For example, when a conductor, such as a coil, is exposed to a changing magnetic field, a circulating flow of electrons can be caused within the body of the conductor. This circulating flow of electrons, called eddy currents, can generate unwanted heat and can cause energy loss in the inductive system. Other problems associated with the use of inductive coils can occur as a result of hysteresis.

As devices increasingly become smaller in size, the inductive coils that are included in such devices are also being designed to be smaller in size. However, despite the inductive coil being very small in size, the disadvantages due to eddy current loss and hysteresis loss still remain.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein include a coil assembly that includes features for enabling the coil assembly to be more readily used on substrates and other confined spaces. The coil assembly can be used in a mobile computing device as part of an inductive signal interface to inductively exchange power and/or data with another device. The coil assembly comprises a coil that is provided on a substrate, such as a printed circuit board. Among other features, the coil includes a trace element that is wound on the substrate and that has an interior gap that extends or is present along the trace element. This interior gap formation is shaped and/or designed to reduce the presence of eddy currents that would otherwise be generated when the coil is active to inductively transmit and/or receive signals. Reducing the presence or formation of eddy currents help to decrease energy loss and enable a more efficient inductive transfer and/or exchange of signals.

Other embodiments described herein include a coil assembly that can be used with an inductive signal interface to inductively transmit and/or receive signals. The coil assembly can include one or more contacts to enable a connection with one or more electrical components. The electrical components could be a part of the inductive signal interface to enable the coil assembly to transmit and/or receive power and/or data to and from another device.

In other embodiments, the coil assembly can comprise one or more coils. A first coil provided on the substrate could be used to transmit or receive power to or from another device. A second coil provided on the substrate could be used to transmit or receive data to or from another device. The second coil is provided so that the two coils do not overlap on the substrate. The second coil could be provided on the substrate to circumscribe at least a portion of the first coil, or could be provided on a different layer of the substrate.

Embodiments also provide for a coil assembly in which the coil includes a trace element that is wound on the substrate and that has two or more interior gaps that extend or is present along the trace element. These interior gaps are also designed to reduce the presence of eddy currents that would otherwise be generated when the coil is active to inductively transmit and/or receive signals.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system provided for in this application may require use of memory, processors and network resources, including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistants, laptop computers, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

Figure 1:
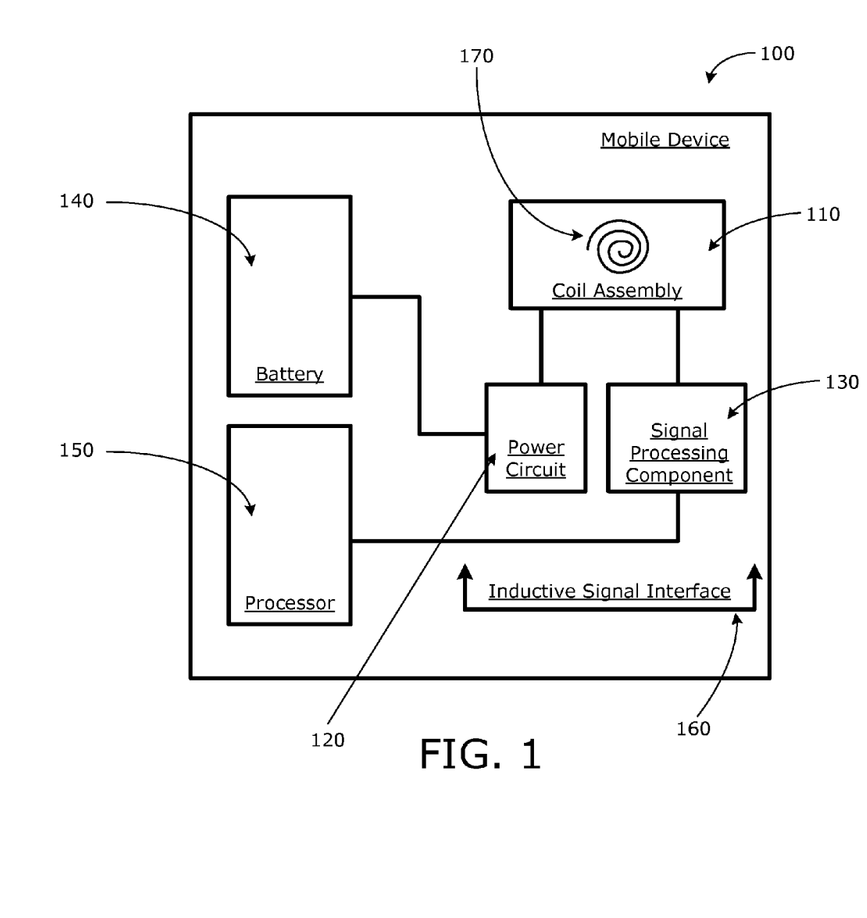
FIG. 1 is a simplified block diagram of a mobile device that includes a coil assembly under an embodiment.

FIG. 1 is a simplified block diagram of a mobile computing device that includes a coil assembly under an embodiment. More specifically, FIG. 1 illustrates a mobile computing device 100 that includes an enhanced coil assembly for use in transfer of power and/or data. As described herein, the coil assembly 110 is structured to handle eddy currents, and further promotes use of the coil assembly in limited spatial constrains (e.g. flex circuit, PCB).

As examples, the mobile computing device 100 may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

In some embodiments, the mobile computing device can be brought into contact or close proximity with a second device to enable the transfer of power and/or data signals between the two devices. Both the mobile computing device and the second device can include inductive resources to enable the transfer of power and/or data to be performed inductively, without the use of traditional connectors (e.g., a male connector and a corresponding female connector). The second device can be a docking station, an accessory device (e.g., a speaker set, a printer, or a display device, for example), or another computing device that has inductive resources to transmit and/or receive power and/or data to and from the mobile computing device.

The coil assembly 110 of the mobile computing device 100 is specifically designed to reduce the presence of eddy currents that would otherwise be generated when the coil is active to inductively transmit and/or receive signals. In some embodiments, the coil of the coil assembly 110 includes trace elements that are shaped or otherwise structured to contain an internal gap or gap formations to help reduce the formation of eddy currents. The internal gap can extend along at least a portion of the trace so that the coil assembly 110 can be used by the mobile computing device 100 to enable an efficient inductive transfer and/or exchange of data and/or power with another device.

In one embodiment, the mobile computing device 100 comprises a coil assembly 110, a power circuit 120, a signal processing component 130, a battery source 140, and a processor 150. An inductive signal interface 160, which includes the coil assembly 110, the power circuit 120, and the signal processing component 130, enables the mobile computing device to inductively transmit and/or receive power and/or data to and from another device. The mobile computing device can also include other components and circuitry such as a display, a keyboard, network and radio resources, and memory, but are not illustrated in FIG. 1 for simplicity.

Typically, inductive exchange of power and/or data is performed by using two coils. A primary coil (in a charging dock, for example) is used to create an electromagnetic field. If a secondary coil is close enough to the primary coil, the electromagnetic field created by the primary coil induces the secondary coil (in the mobile computing device, for example) to generate a current. In this manner, inductive transfer of power and/or data can be performed by two devices, each device comprising at least one coil.

The mobile computing device 100 is enabled to inductively exchange power and/or data from another device through use of the inductive signal interface 160. The inductive signal interface 160 includes circuitry (including the power circuit 120 and the signal processing component 130) for converting signals from magnetic fields into electrical signals, and vice versa. In one embodiment, the inductive signal interface 160 is coupled to the battery source 140 so that when the coil assembly 110 receives a power signal from another device inductively (such as a charging dock), the battery source 140 can be charged. Similarly, the inductive signal interface 160 is coupled to the processor 150 so that when the coil assembly 110 receives a data signal from another device inductively, the data signal can be processed and routed to the processor 150.

The coil assembly 110 comprises one or more cons provided on a substrate. The one or more coils are used by the mobile computing device to inductively transmit and/or receive signals to and from another device. As part of the inductive signal interface 160, the one or more coils in the coil assembly 110 interacts with one or more coils of the other device to inductively exchange power and/or data. In one embodiment, the coil assembly 110 comprises a first coil 170 that is printed on or etched in the substrate. The trace of the first coil 170 is printed on or etched in the substrate so that it is wound in a circular fashion (e.g., like a spiral) and does not overlap itself. The trace can be composed of copper or other conductive materials.

In some embodiments, the inductive signal interface 160 can use the first coil 170 in the coil assembly 110 to transmit and/or receive power signals. For example, in an inductive charging system, the mobile computing device 100 can be brought into contact or close proximity with another device, such as a charging dock, to enable the charging dock to inductively charge the mobile computing device 100. The coil assembly 110 can also include a second coil that is provided on the substrate. The second coil can be used to transmit and/or receive data signals from another device. Additional coils for exchanging data and/or power can also be included in some embodiments (e.g., a third coil can also be used for transmitting and/or receiving data signals, such as RFID). In other embodiments, the first coil 170 in the coil assembly 110 can be used to transmit and/or receive both power and/or data signals from another device.

As discussed above, the coil assembly 110 comprises one or more coils that are provided on a substrate. In one embodiment, the substrate can be a printed circuit board. The printed circuit board can be single-sided, double-sided, or multi-layered. Various types of printed circuit boards can be used as part of the coil assembly 110, such as printed circuit boards made from different materials. For example, the printed circuit board could be any one of: FR-1, FR-2, FR-3, FR-4, FR-5, FR-6, CEM-1, CEM-2, CEM-3, CEM-4, CEM-5, Flex, etc. In some embodiments, the coil assembly 110 can comprise one or more coils provided on a flex printed circuit board. A flex printed circuit board enables the coil assembly 110 to be flexible enough to be bent, twisted, rounded or shaped within the housing of the mobile computing device 110.

In some circumstances, a flexible coil assembly 110, with the one or more coils provided on a flex printed circuit board, can provide various benefits. The coil assembly 110, comprised of a flex printed circuit board, can have the same inductive capabilities as a wire-wound coil, but can also provide significant benefits. Flex printed circuit boards are very thin in thickness and can be used in mobile computing devices that are designed to be small. For example, the coil assembly 110 that is comprised of a coil that is provided on a flex printed circuit board can have a total thickness of 0.4 mm or less. Another benefit for using a coil assembly 110 that comprises a flex printed circuit board is that the coil assembly 110 can be used to closely fit within the housing of the mobile computing device 100 even though the housing may be rounded in shape (because of its flexibility). Again, this is beneficial for smaller mobile computing devices, where the size of the internal components can be a constraint to the design of the device. In addition, there could be production cost benefits as it can be cheaper to produce a coil assembly in which the coil is printed or etched on a printed circuit board.

As discussed above, the printed circuit board can be single-sided, double-sided, or multi-layered. In one embodiment, the coil 170 of the coil assembly 110 can be provided on a single-sided printed circuit board. In another embodiment, the printed circuit board (such as FR-4 type or flex) can be a double-sided printed circuit board so that the coil 170 can be provided on both sides of the printed circuit board. Because the size or magnitude of the electromagnetic field transmitted and/or received by the coil 170 can vary due to the size of the coil 170, the coil 170 that is provided on both sides of the printed circuit board could enable a more efficient or faster exchange of power and/or data. The coil 170 of the coil assembly 110 can be printed on the printed circuit board so that the coil 170 winds in on one side and winds out on the other side. The trace of the coil 170 is one single conductive trace, even though it is provided on both sides of the printed circuit board.

In some embodiments, the coil assembly 110 includes a second coil that is provided on the printed circuit board. Referring back to the embodiments described above, on a single-sided printed circuit board, the first coil 170 can be provided on the printed circuit board with the second coil circumscribing at least a portion of the first coil 170. This enables the first coil 170 and the second coil to maintain their function to provide inductive signaling, while being provided on the same coil assembly 110.

In another embodiment, the coil assembly 110 can include a double-sided printed circuit board so that the first coil 170 is provided on one side of the printed circuit board and the second coil is provided on the other side of the printed circuit board. The coil assembly 110 can also be designed so that the first coil 170 is provided on both sides of the double-sided printed circuit board and the second coil is provided on either one side or on both sides of the printed circuit board by circumscribing at least a portion of the first coil 170. As discussed, in certain embodiments, the first coil 170 can be used to inductively transmit and/or receive power signals, while the second coil can be used to inductively transmit and/or receive data signals. Similarly, the first coil 170 can be used to inductively transmit and/or receive data signals, while the second coil can be used to inductively transmit and/or receive power signals. In other embodiments, three or more separate coils can be provided on the coil assembly 110.

The coil assembly 110 can also comprise one or more electrical contacts to enable the coil assembly 110 to be connected to one or more electrical components of the mobile computing device 100. In one embodiment, by providing the coil 170 on the printed circuit board and connecting the trace of the coil to one or more electrical components, the power circuit 120 and the signal processing component 130 can be connected to the coil assembly 110. This allows for the mobile computing device 100 to use the inductive signal interface 160 to transmit and/or receive signals inductively.

Integrating a coil assembly 110 with the mobile computing device 100 can provide various benefits. First, because the coil 170 of the coil assembly 110 can be integrated with a printed circuit board, the coil and the electrical contacts can be part of the same assembly. This eliminates the dependence on wire-wound coils and can be cheap and easy to manufacture. In addition, because the trace of the coil 170 can be printed or etched into the printed circuit board, the coil assembly 110 can be very thin in thickness. The coil assembly 110 can also be designed to provide other benefits depending on the design of the coil 170 itself.

Coil Assembly

Figure 2:
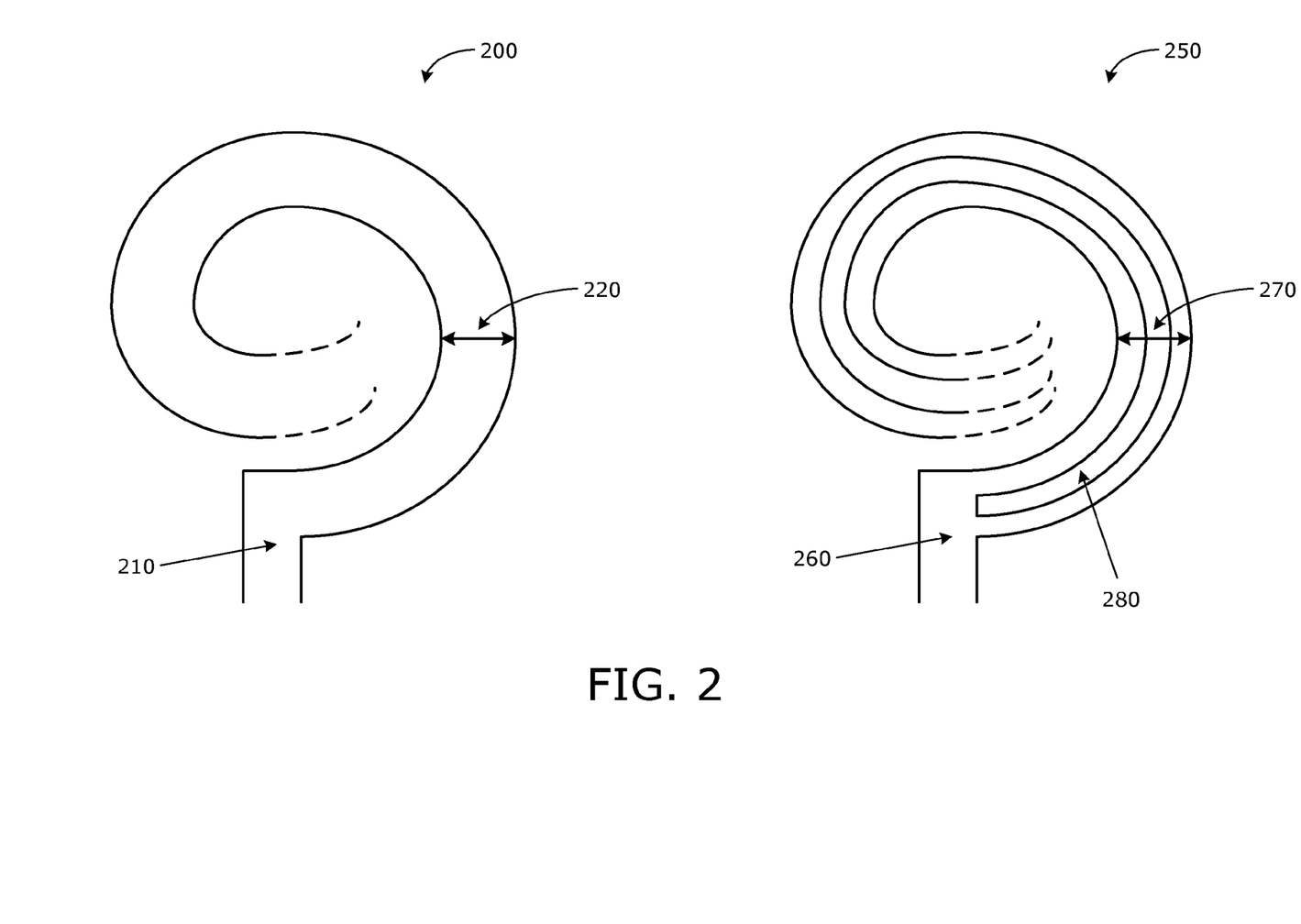
FIG. 2 is an illustrative representation of a coil that is part of a coil assembly according to an embodiment.

FIG. 2 is an illustrative representation of a coil that is part of a coil assembly according to an embodiment. As discussed above, in one embodiment, a coil assembly comprises a coil that is provided on a substrate. Coil 200 is an example of a coil that is provided on a substrate and that comprises a trace 210 with a width or thickness 220. The trace 210 of the coil 200 is printed on or etched in the substrate so that it is wound in a circular fashion (e.g., like a spiral) and does not overlap itself. For clarification, the complete winding of the coil 200 is not illustrated in FIG. 2.

Coil 250 is another example of a coil that is provided on a substrate, according to another embodiment. Like coil 200, coil 250 comprises a trace 260 that has an overall width with a thickness 270. The trace 260 of the coil 250 is printed on or etched in the substrate so that it is wound in a circular fashion and does not overlap itself. In this illustration, the coil 200 and the coil 250 are approximately the same size, e.g., the overall size of the coils and the thickness of the trace 210 and the thickness of the trace 260 are also approximately the same size. The trace 260 of the coil 250, however, is different from that of coil 200 because the trace 260 includes an interior gap 280. This interior gap 280 extends or is present along at least a portion of the trace 260. In one embodiment, the interior gap 280 extends along the trace 260 in the same fashion in which the trace 260 is wound (e.g., the majority of the trace 260 appears to be split into parallel traces). This interior gap 280 can be dimensioned to reduce a presence of eddy currents that would otherwise be generated when the coil is active to inductively transmit and/or receive signals.

Although an interior gap 280 extends or is present along the length of the trace 260, the trace 260 of the coil 250 is one single conductive trace. As described previously, in one embodiment, the coil 250 can be provided on a double-sided printed circuit board. The coil 250 can be provided on the printed circuit board so that the coil 250 winds in on one side and winds out on the other side. The trace 260 of the coil 250 would be one single conductive trace, even though the trace 260 would be provided on both sides of the printed circuit board and also has an interior gap 280 that extends or is present along the length of the trace 260.

In another embodiment, the trace 260 of the coil 250 can have two or more interior gaps. For example, the trace 260 can have two interior gaps that extend or are present along at least a portion of the trace 260. The interior gaps extend along the trace 260 in the same fashion in which the trace 260 is wound (e.g., the majority of the trace 260 appears to be split into multiple parallel traces). The thicknesses or widths of the interior gaps can be dimensioned (i.e., design tuned) to reduce the presence of eddy currents that would otherwise be generated when the coil is active to inductively transmit and/or receive signals. In one embodiment, the thickness or the width of the interior gap can be dimensioned or tuned in order to reduce the amount of copper loss, but still enable a reduction in eddy current formation (e.g., find a balance between removing too much copper and reducing eddy currents from forming). Similarly, a trace with multiple interior gaps can also be design tuned so that the thicknesses or widths of the interior gaps can reduce the presence of eddy currents when the trace is active.

The benefit of having an interior gap 280 (or multiple interior gaps) is that the presence of eddy currents within the trace 260 can be reduced. In coil 200, when the trace 210 is exposed to a changing magnetic field, a circulating flow of electrons (e.g., eddy currents) can be created within the body of the trace 210. This is a result of the trace 210 being comprised of a conductive material. Because the trace 210 has an inherent thickness or width 220, when the coil is active to inductively transmit and/or receive signals, small eddy currents form within the trace 210. These eddy currents can generate unwanted heat and can cause energy loss in the inductive system when the mobile computing device uses a coil assembly comprising the coil 200.

However, in one embodiment, when the mobile computing device uses a coil assembly comprising the coil 250, the presence of eddy currents can be significantly reduced. The presence of the interior gap 280, which extends along the trace 260 of the coil 250, helps prevent eddy currents from forming within the trace 260. When the trace 260 is exposed to a changing magnetic field, the creation of eddy currents within the body of the trace 260 is reduced. In addition, the presence of the interior gap 280 still allows the coil to inductively transmit and/or receive signals when the coil 250 is active. This is because the trace 250 is still a single conductive trace (even with the interior gap 280 present). By reducing the amount of eddy currents from forming within the trace 260, the generation of unwanted heat in the coil assembly of the mobile computing device can also be reduced. Reducing the amount of eddy currents from forming can also help minimize interference on the various circuitry and components of the mobile computing device.

Figure 3:
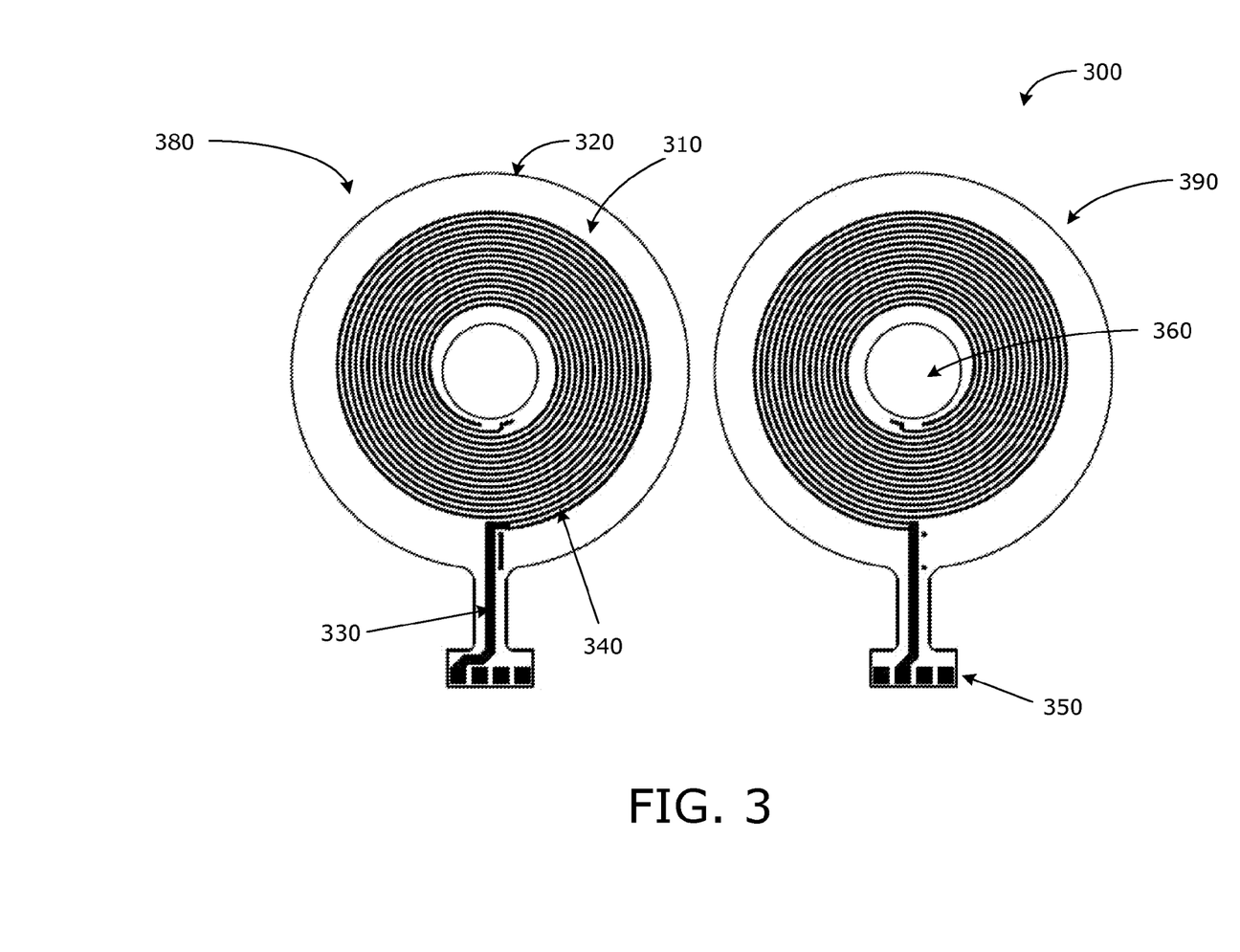
FIG. 3 illustrates a coil assembly under an embodiment.

FIG. 3 illustrates a coil assembly according to an embodiment. The coil assembly 300 comprises a coil 310 that is provided on a printed circuit board 320. The printed circuit board 320 can be an FR-4 printed circuit or a flex printed circuit board, or other types discussed above. The coil 310 comprises a trace 330 that is printed or etched in the printed circuit board 320 and wound in a circular fashion (e.g., like a spiral) so that it does not overlap itself. In the illustration provided by FIG. 3, the coil assembly 300 also comprises a double-sided printed circuit board 320 (i.e., side 380 and side 390 are shown). This enables the coil 310 to be provided on both sides of the double-sided printed circuit board. The coil 310 winds in on one side of the printed circuit board 320 (e.g., side 380), and winds out on the other side (e.g., side 390). Although the coil 310 is provided on both sides of the printed circuit board 320, the trace 330 of the coil 310 is one single conductive trace (e.g., the trace is connected from one side to the other side through the printed circuit board, near the center 360).

The trace 330 of the coil 310 includes an interior gap 340. An example of the interior gap 340 can be seen in the illustrative representation of the coil 250 in FIG. 2. This interior gap 340 extends along the length of the trace 330 so that it extends along the trace 330 in the same fashion in which the trace 330 is wound. This interior gap 340 can be dimensioned to reduce the presence of eddy currents that would otherwise be generated when the coil 310 is active to inductively transmit and/or receive signals.

The coil assembly 300 also comprises one or more electrical contacts 350 to enable the coil assembly 300 to connect to one or more electrical components. In this way, the coil assembly 300 can be used as part of an inductive signal interface of a mobile computing device to inductively transmit and/or receive signals from another device.

Figure 4:
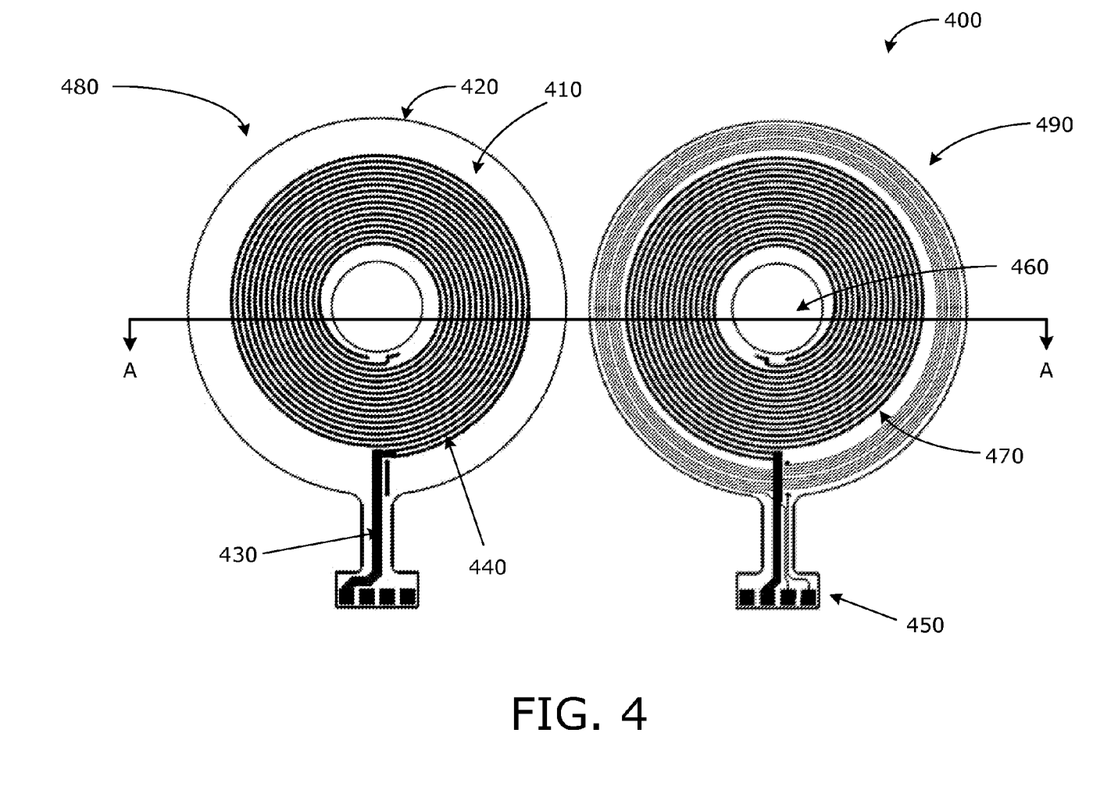
FIG. 4 illustrates a coil assembly under another embodiment.

FIG. 4 illustrates a coil assembly under another embodiment. The coil assembly 400 comprises a coil 410 that is provided on a printed circuit board 420. The printed circuit board 420 can be an FR-4 printed circuit or a flex printed circuit board, or other types discussed above. The coil 410 comprises a trace 430 that is printed or etched in the printed circuit board 320 and wound in a circular fashion so that it does not overlap itself. The coil assembly 400 also comprises a double-sided printed circuit board 420 (i.e., side 480 and side 490 are shown) so that the coil 410 can be provided on both sides of the double-sided printed circuit board. The coil 410 winds in on one side of the printed circuit board 420 (e.g., side 480), and winds out on the other side (e.g., side 490). Although the coil 410 is provided on both sides of the printed circuit board 420, the trace 430 of the coil 410 is one single conductive trace (e.g., the trace is connected from one side to the other side through the printed circuit board, near the center 460).

The trace 430 of the coil 410 includes an interior gap 440. This interior gap 440 extends along the length of the trace 430 so that it extends along the trace 430 in the same fashion in which the trace 430 is wound. This interior gap 440 can be dimensioned to reduce the presence of eddy currents that would otherwise be generated when the coil 410 is active to inductively transmit and/or receive signals. The coil assembly 400 also includes a second coil 470. The second coil 470 can be provided on either one side or on both sides of the printed circuit board 420. In the illustration provided in FIG. 4, the second coil 470 is provided on side 490 so that it circumscribes at least a portion of the coil 410.

As discussed previously, the coil 410 can be used to inductively transmit and/or receive power signals, while the second coil 470 can be used to inductively transmit and/or receive data signals. In another embodiment, the coil 410 can be used to inductively transmit and/or receive data signals, while the second coil 470 can be used to inductively transmit and/or receive power signals. The coil assembly 300 also comprises one or more electrical contacts 350 to enable the coil assembly 300 to connect to one or more electrical components. The coil assembly 400 can be used as part of an inductive signal interface of a mobile computing device to inductively transmit and/or receive signals from another device.

Figure 5:
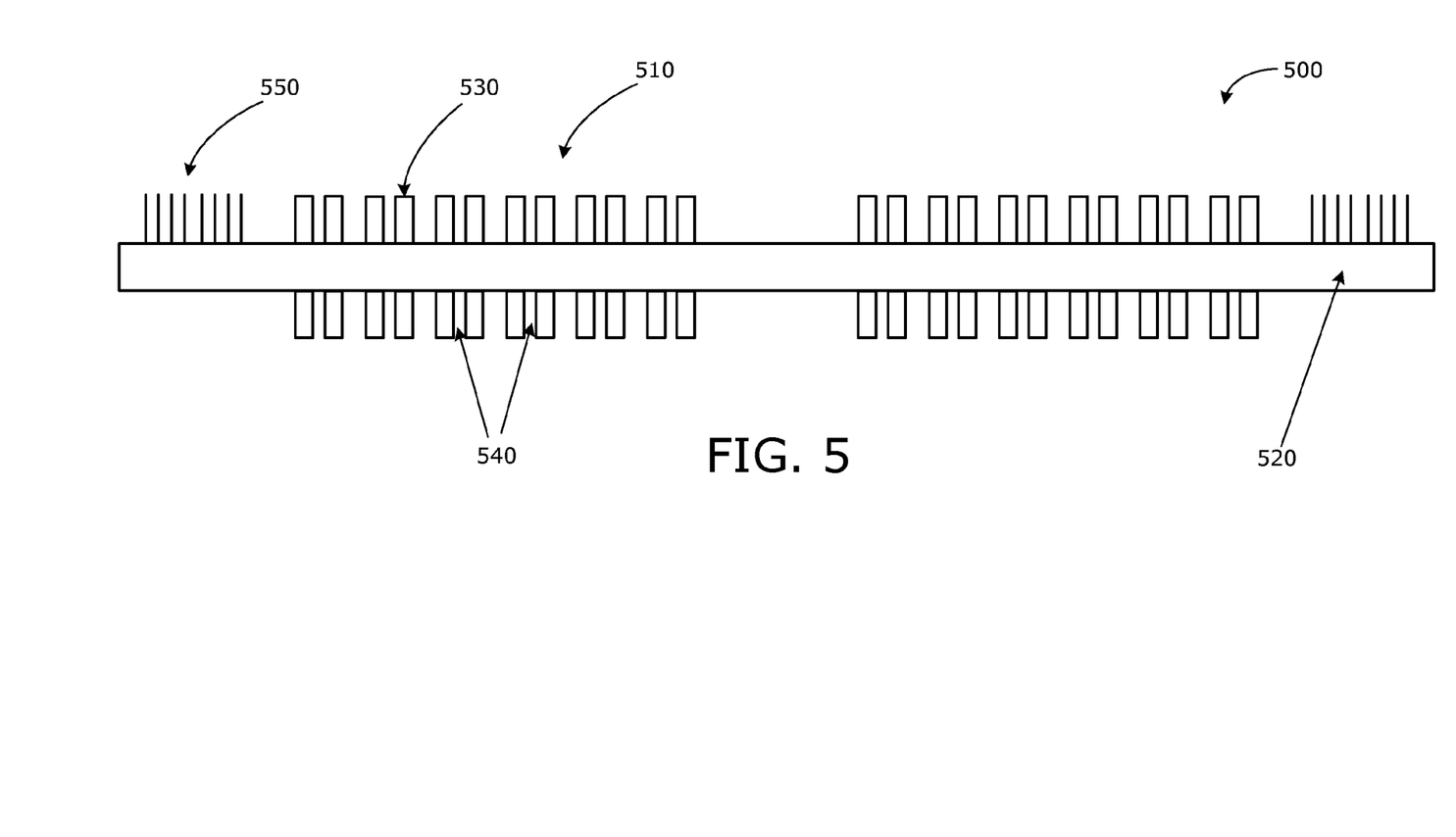
FIG. 5 is a cross-section illustration of a coil assembly according to an embodiment.

FIG. 5 is a cross-section illustration of a coil assembly according to an embodiment. In one example, FIG. 5 can be an illustration of a side-cross sectional view of the coil assembly in FIG. 4 across line A-A. Coil assembly 500 comprises a coil 510 that is provided on a double-sided printed circuit board 520 (FR-4 or flex, for example). As discussed previously, the coil 510 can be printed on or etched in the printed circuit board 520. The coil 510 is provided on both sides of the printed circuit board 520 and comprises a trace 530. The trace 530 is composed of copper or other conductive materials.

The trace 530 includes an internal gap 540. The internal gap 540 extends or is present along at least a portion of the trace 530. This interior gap 540 can be dimensioned to reduce a presence of eddy currents that would otherwise be generated when the coil 510 is active to inductively transmit and/or receive signals. In another embodiment, two or more internal gaps could be present within the trace 530.

The coil assembly 500 also comprises a second coil 550 that is provided on the printed circuit board 520. The second coil 550 can be printed on or etched in the printed circuit board 520 like the coil 510. In one embodiment, the coil 510 is used to inductively transmit and/or receive power signals, while the second coil 550 is used to inductively transmit and/or receive data signals.

Figure 6:
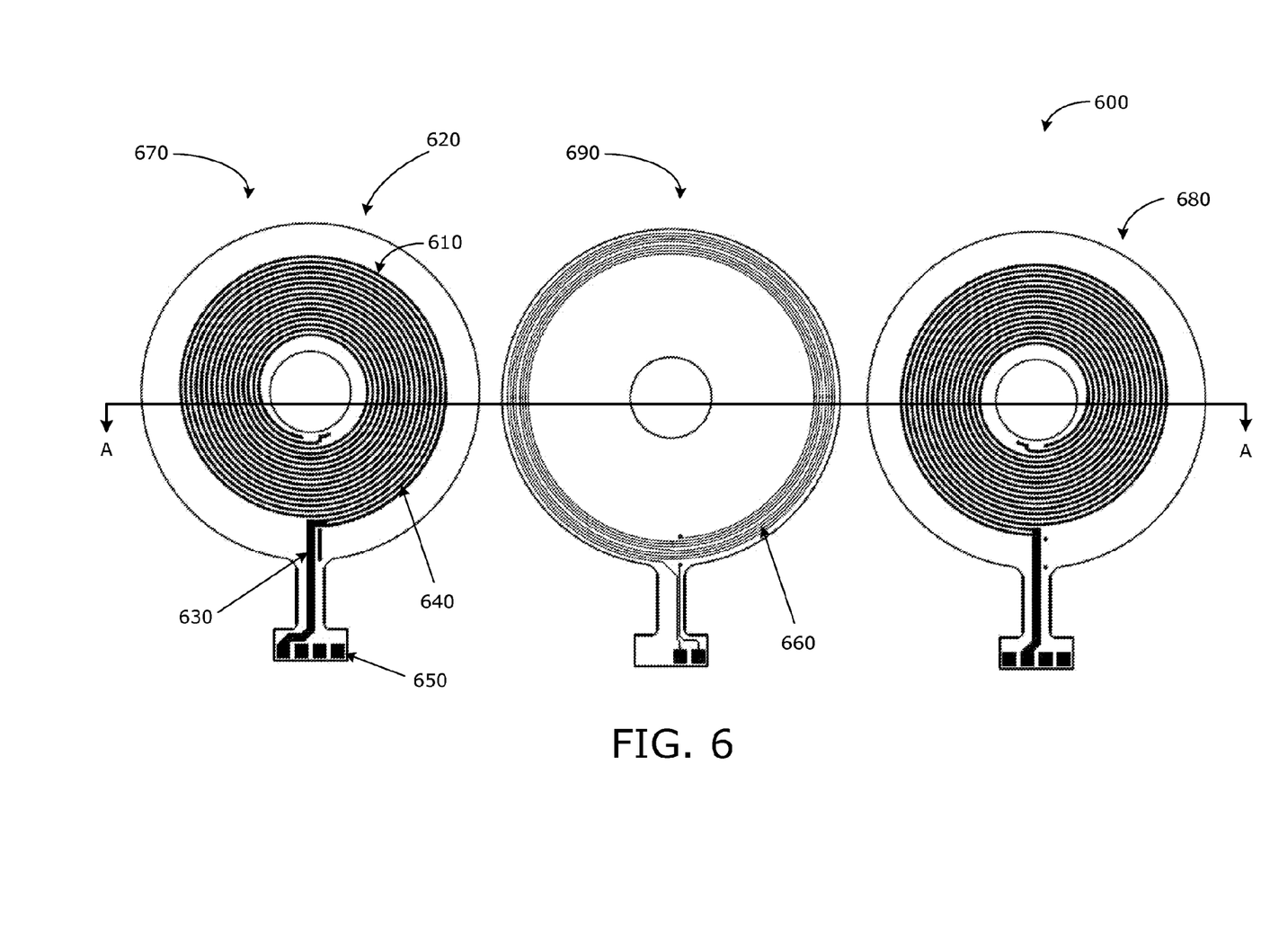
FIG. 6 illustrates a coil assembly under an embodiment.

FIG. 6 illustrates a coil assembly under another embodiment. The coil assembly 600 comprises a coil 610 that is provided on a printed circuit board 620. The printed circuit board 620 can be an FR-4 printed circuit or a flex printed circuit board, or other types discussed above. The coil 610 comprises a trace 630 that is printed or etched in the printed circuit board 620 and wound in a circular fashion so that it does not overlap itself. The coil assembly 600 also comprises a multi-layered printed circuit board 620. In the illustration provided, the coil assembly 600 comprises three copper layers. The coil 610 winds in on the first layer of the printed circuit board 620 (e.g., layer 670), and winds out on the second layer (e.g., layer 680). A second coil 660 can be provided between the first layer 670 and the second layer 680 (e.g., in the middle copper layer 690). Although the coil 610 is provided on two layers of the printed circuit board 620, the trace 630 of the coil 610 is one single conductive trace.

The trace 630 of the coil 610 includes an interior gap 640. This interior gap 640 extends along the length of the trace 630 so that it extends along the trace 630 in the same fashion in which the trace 630 is wound. This interior gap 640 can be dimensioned to reduce the presence of eddy currents that would otherwise be generated when the coil 610 is active to inductively transmit and/or receive signals.

The coil 610 can be used to inductively transmit and/or receive power signals, while the second coil 660 can be used to inductively transmit and/or receive data signals. In another embodiment, the coil 610 can be used to inductively transmit and/or receive data signals, while the second coil 660 can be used to inductively transmit and/or receive power signals. The coil assembly 600 also comprises one or more electrical contacts 650 to enable the coil assembly 600 to connect to one or more electrical components. The coil assembly 600 can be used as part of an inductive signal interface of a mobile computing device to inductively transmit and/or receive signals from another device.

Figure 7:
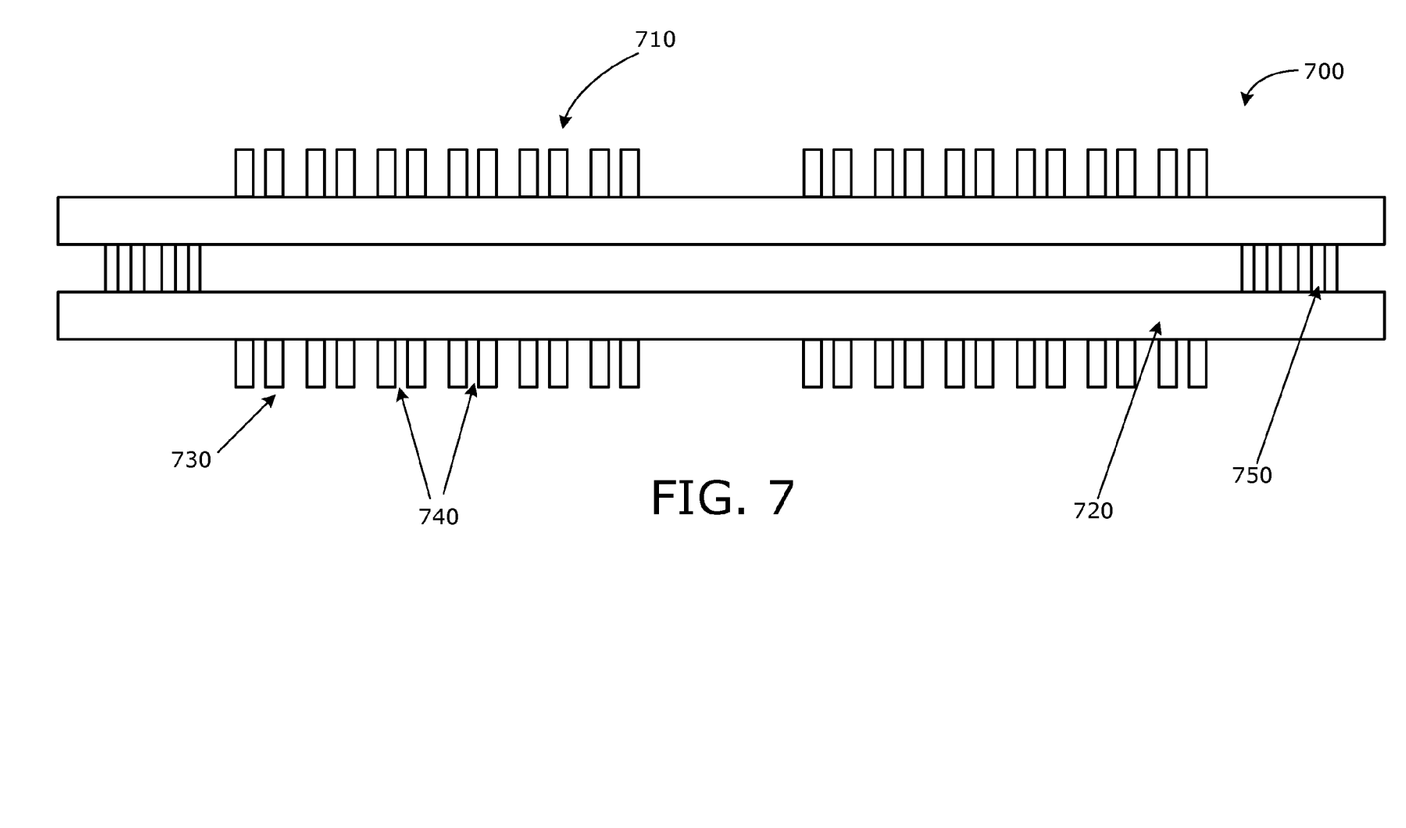
FIG. 7 is a cross-section illustration of a coil assembly according to another embodiment.

FIG. 7 is a cross-section illustration of a coil assembly according to another embodiment. In one example, FIG. 7 can be an illustration of a side-cross sectional view of the coil assembly in FIG. 6 across line A-A. Coil assembly 700 comprises a coil 710 that is provided on a multi-layered printed circuit board 720 (FR-4 or flex, for example). As discussed previously, the coil 710 can be printed on or etched in a copper layer of the printed circuit board 720. The coil 710 is provided on two layers of the printed circuit board 720 and comprises a trace 730. The trace 730 is composed of copper or other conductive materials.

The trace 730 includes an internal gap 740. The internal gap 740 extends or is present along at least a portion of the trace 730. This interior gap 740 can be dimensioned to reduce a presence of eddy currents that would otherwise be generated when the coil 710 is active to inductively transmit and/or receive signals. In another embodiment, two or more internal gaps could be present within the trace 730.

The coil assembly 700 also comprises a second coil 750 that is provided on the printed circuit board 720. The second coil 750 can be in the middle copper layer of the printed circuit board 720. In one embodiment, the coil 710 is used to inductively transmit and/or receive power signals, while the second coil 750 is used to inductively transmit and/or receive data signals.

Alternative Embodiments

Figure 8:
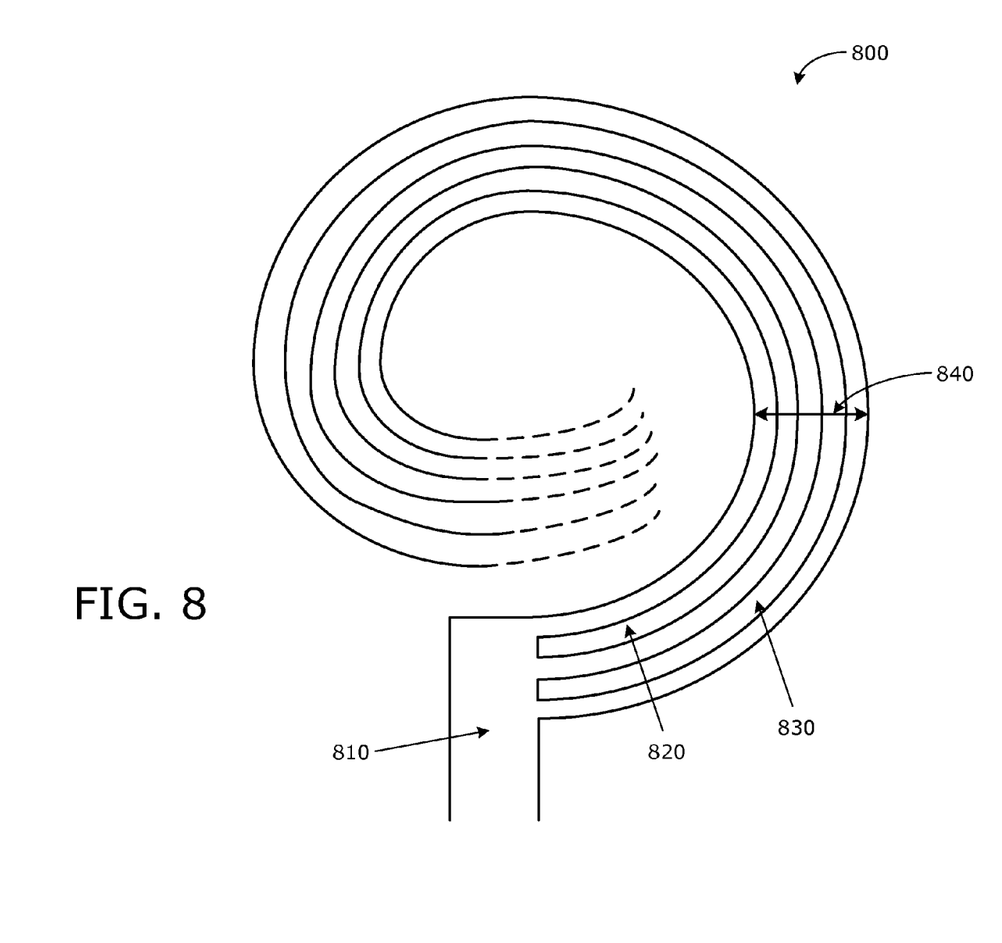
FIG. 8 is an illustrative representation of a coil that is part of a coil assembly according to another embodiment.

In other embodiments, other variations of the coil assembly are possible. FIG. 8 is an illustrative representation of a coil that is part of a coil assembly according to another embodiment. Coil 800 is an example of a coil that is provided on a substrate and that comprises a trace 810 with a width or thickness 840. The trace 810 includes two or more interior gaps 820, 830 and is wound in a circular fashion so that it does not overlap itself.

Figure 9:
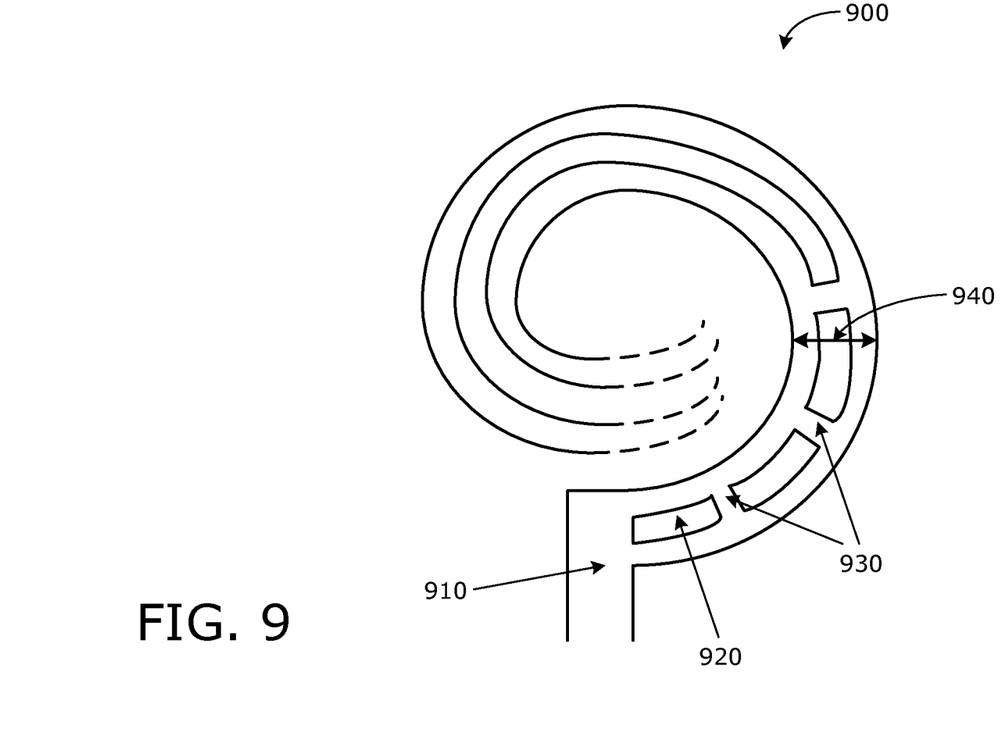
FIG. 9 is an illustrative representation of a coil that is part of a coil assembly under an embodiment.

FIG. 9 is another illustrative representation of a coil that is part of a coil assembly under a different embodiment. Coil 900 is an example of a coil that is provided on a substrate and that comprises a trace 910 with a width or thickness 940. The trace 910, however, in coil 900, includes a plurality of interior gaps 920 that are partitioned in different parts. The interior gaps 920 include one or more bridges 930 (e.g., which are a part of the trace 910) so that the interior gaps 920 are segmented. The interior gaps 920 may extend along the length of the trace 910 of the coil 900, be cut off by the bridge 930, may extend again along the length of the coil 900, and then be cut off again by another bridge 930, and so on.

In another embodiment, the coil assembly may be provided on more than one layer of a substrate (e.g., a flex printed circuit board) so that more coils are stacked on top of one another. For example, there may be four copper layers of the trace, with three layers of the substrate in between each of the four copper layers. The coils that are provided on the copper layers may be one single trace (as discussed above). Similarly, a coil assembly as discussed may be stacked on top of another (or many coil assemblies stacked on top of each other) with the coils connecting to a lead that is at the entry or exit of the stacked coil assemblies.

Figure 10:
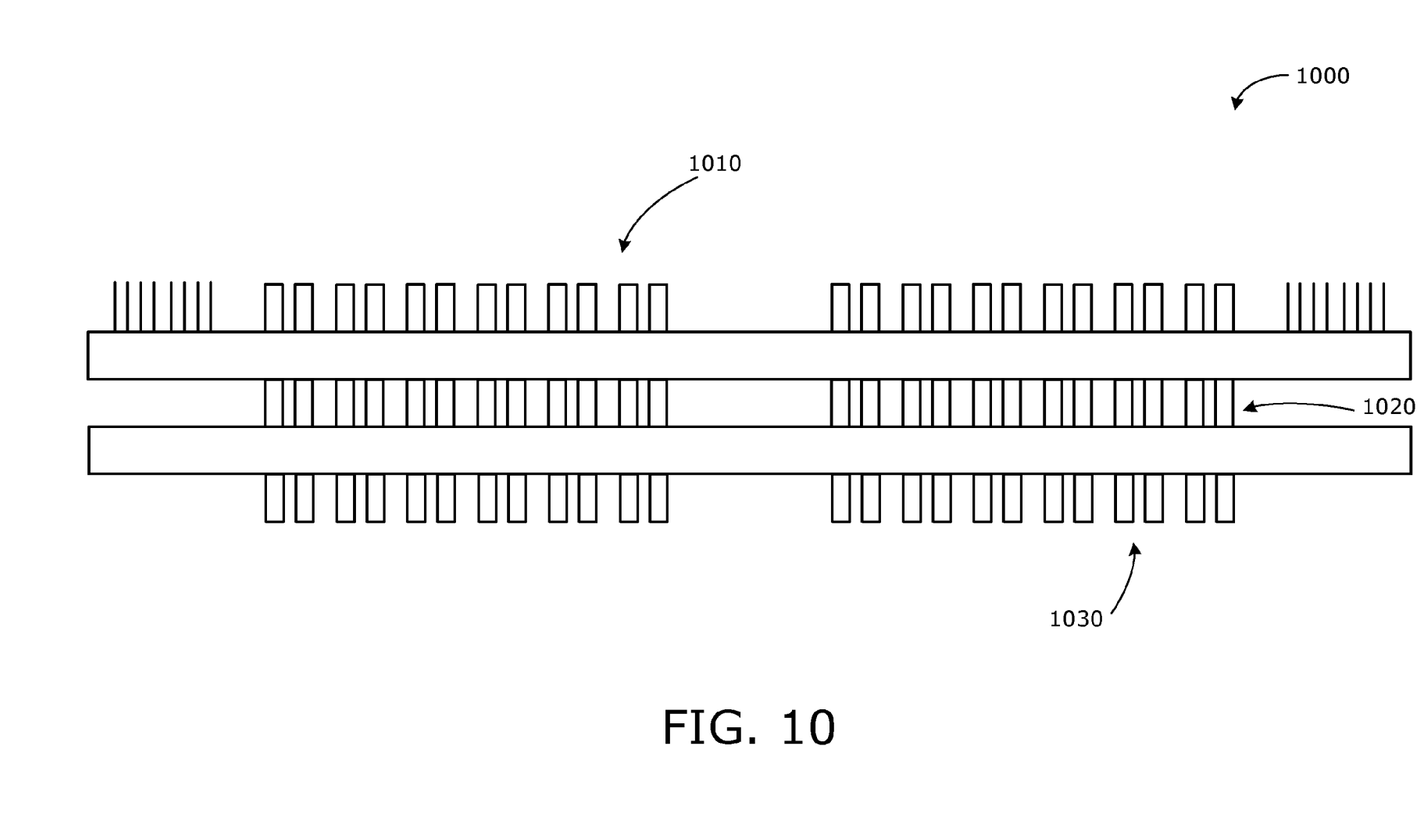
FIG. 10 is a cross-section illustration of a coil assembly according to an embodiment.

FIG. 10 illustrates a cross-section illustration of a coil assembly that is stacked on top of another coil assembly. As discussed, the coil assembly may be stacked with the coils being connected by one single trace. For example, the coil assembly 1000 includes a coil 1010 that is provided on a first layer, a second coil 1020 that is provided on a second layer, and a third coil 1030 that is provided on a third layer. The coil 1010, coil 1020 and coil 1030 may be connected together by one single trace. In other embodiments, a coil assembly as discussed may be stacked on top of another (or many coil assemblies stacked on top of each other) with the coils having different traces and connecting to a lead that is at the entry or exit of the stacked coil assemblies.

It is contemplated for embodiments described herein to extend to individual elements and concepts described herein, independently of other concepts, ideas or systems, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A coil assembly for a mobile computing device, comprising:
   a circuit board;
   a first coil printed on the circuit board, the first coil comprising an inwardly winding trace; and
   a second coil printed on an opposing side of the circuit board in relation to the first coil, the second coil comprising an outwardly winding trace, wherein the inwardly winding trace connects to the outwardly winding trace through the circuit board;
   wherein the inwardly winding trace and the outwardly winding trace each comprise an interior gap dimensioned to reduce eddy currents generated when the first coil and the second coil are active to inductively transmit or receive signals.

2. The coil assembly of claim 1, further comprising:
   one or more contacts to electrically connect the coil assembly with one or more electrical components of the mobile computing device.

3. The coil assembly of claim 1, wherein the circuit board comprises a flex printed circuit board.

4. The coil assembly of claim 1, wherein the circuit board comprises a FR-4 printed circuit board.

5. The coil assembly of claim 1, further comprising:
   a third coil printed on the circuit board, the third coil comprising a winding trace that does not overlap the first coil or the second coil.

6. The coil assembly of claim 5, wherein the third coil circumscribes the first coil and the second coil.

7. The coil assembly of claim 6, wherein the circuit board is a multi-layered printed circuit board.

8. The coil assembly of claim 7, wherein the third coil is printed on a separate layer of the multi-layered printed circuit board in relation to the first coil and the second coil.

9. The coil assembly of claim 7, wherein the third coil is printed on a middle layer in between two outer layers of the multi-layered printed circuit board, the two outer layers comprising the first coil and the second coil, respectively.

10. The coil assembly of claim 1, wherein the inwardly winding trace and the outwardly winding trace comprise a second interior gap parallel to the interior gap, the second interior gap extending along at least a portion of the inwardly winding trace and the outwardly winding trace.

11. The coil assembly of claim 1, wherein the interior gap includes one or more bridges partitioning the interior gap into two or more portions.

12. The coil assembly of claim 5, wherein the first coil and the second coil are configured to inductively transmit or receive power, and wherein the third coil is configured to inductively transmit or receive data.

13. The coil assembly of claim 2, wherein the coil assembly is configured to transmit power and/or data to the one or more electrical components of the mobile computing device via the one or more contacts.

14. The coil assembly of claim 13, wherein the one or more electrical components of the mobile computing device comprise at least one of: (i) a power circuit component, or (ii) a signal processing component.

15. The coil assembly of claim 5, wherein the inwardly and outwardly winding of the first and second coils comprise a different trace thickness in comparison to the winding trace of the third coil.

16. A mobile computing device comprising:
a coil assembly, wherein the coil assembly comprises:
a circuit board;
a first coil printed on the circuit board, the first coil comprising an inwardly winding trace; and
a second coil printed on an opposing side of the circuit board in relation to the first coil, the second coil comprising an outwardly winding trace, wherein the inwardly winding trace connects to the outwardly winding trace through the circuit board;
wherein the inwardly winding trace and the outwardly wind trace each comprise an interior gap dimensioned to reduce eddy currents generated when the first coil and second coil are active to inductively transmit or receive signals.

17. The mobile device of claim 16, wherein the coil assembly further comprises a third coil printed on the circuit board, the third coil comprising a winding trace that the not overlap the first coil or the second coil, wherein the first coil and the second coil are configured to inductively transmit or receive power, and wherein the third coil is configured to inductively transmit or receive data.

18. The mobile device of claim 16, wherein the circuit board comprises one of: (i) a FR-4 printed circuit board, or (ii) a flex printed circuit board.

19. An inductive signal interface comprising:
a coil assembly, wherein the coil assembly comprises:
a circuit board;
a first coil printed on the circuit board, the first coil comprising an inwardly winding trace;
a second coil printed on an opposing side of the circuit board in relation to the first coil, the second coil comprising an outwardly winding trace, wherein the inwardly winding trace connects to the outwardly winding trace through the circuit board;
wherein the inwardly winding trace and the outwardly winding trace each comprise an interior gap dimensioned to reduce eddy currents generated when the first coil and the second coil are active to inductively transmit or receive signals.

20. The inductive signal interface of claim 19, wherein the circuit board comprises one of: (i) a FR-4 printed circuit board, or (ii) a flex printed circuit board.

21. The inductive signal interface of claim 19, wherein inwardly winding trace and the outwardly winding trace comprise a second interior gap parallel to the first interior gap, the second interior gap extending along at least a portion of the inwardly winding trace and the outwardly winding trace.

22. The inductive signal interface of claim 19, wherein the coil assembly further comprises a third coil printed on the circuit board, the third coil comprising a winding trace that circumscribes the first coil and second the coil.

23. The inductive signal interface of claim 22, wherein the circuit board is a multi-layered printed circuit board, and wherein the third coil is printed on a middle layer in between two outer layers of the multi-layered printed circuit board, the two outer layers comprising the first coil and the second coil respectively.

24. The inductive signal interface of claim 23, wherein the first coil and the second coil are configured to inductively transmit or receive power, and wherein the third coil is configured to inductively transmit or receive data.

* * * * *